(12) United States Patent
Farrugia

(10) Patent No.: US 7,350,798 B1
(45) Date of Patent: Apr. 1, 2008

(54) TRAILER HITCH GUIDE

(75) Inventor: Terry L. Farrugia, Traverse City, MI (US)

(73) Assignee: Farrugia Companies, LLC, Traverse City, MI (US)

( * ) Notice: Subject to any disclaimer, the term of this patent is extended or adjusted under 35 U.S.C. 154(b) by 116 days.

(21) Appl. No.: 11/306,319

(22) Filed: Dec. 22, 2005

(51) Int. Cl.
 *B60D 1/40* (2006.01)

(52) U.S. Cl. ..................................... 280/477

(58) Field of Classification Search .............. 280/477
 See application file for complete search history.

(56) References Cited

U.S. PATENT DOCUMENTS

| | | | |
|---|---|---|---|
| 3,418,628 A * | 12/1968 | Fenner | 340/431 |
| D270,906 S * | 10/1983 | Orr | D12/162 |
| D279,092 S | 6/1985 | Snaper | |
| 4,621,432 A | 11/1986 | Law | |
| 5,035,441 A * | 7/1991 | Murray | 280/477 |
| D332,595 S | 1/1993 | Randolph | |
| 5,269,554 A * | 12/1993 | Law et al. | 280/477 |
| 6,042,136 A | 3/2000 | Heinecke | |
| 6,139,041 A * | 10/2000 | Murphy | 280/477 |
| 6,279,940 B1 | 8/2001 | Beavington | |
| 6,341,794 B1 * | 1/2002 | Hunter | 280/477 |
| 6,557,483 B2 | 5/2003 | Nathan | |
| 6,820,888 B1 | 11/2004 | Griffin | |
| 7,036,840 B2 * | 5/2006 | Kwilinski | 280/477 |
| 2004/0207175 A1 * | 10/2004 | Hamilton | 280/477 |

OTHER PUBLICATIONS

Qworks Corporation, Magnetic Hitchin' Rods, 1999, 2 pages, www.qwks.com, U.S.

* cited by examiner

*Primary Examiner*—Lesley D. Morris
*Assistant Examiner*—Daniel Yeagley
(74) *Attorney, Agent, or Firm*—Northern Michigan Patent Law, PLC

(57) ABSTRACT

A trailer hitch guide for ball-and-socket type hitches has an upright rod visible through the rear window of a towing vehicle, a base adapted to be magnetically attached to a socket-forward portion of the trailer-side hitch socket, and a lever arm that extends below the hitch socket to be tripped by the ball portion of the hitch as the towing vehicle is backed up toward the trailer. The socket-forward mounting of the base places the lever arm forward of the trailer socket, such that the guide rod is visibly tripped before the hitch ball is vertically aligned with the trailer socket.

7 Claims, 5 Drawing Sheets

TRAILER HITCH GUIDE

FIELD OF THE INVENTION

The invention is in the field of devices intended to guide the driver of a towing vehicle by sight through the rear window as the vehicle backs up toward a hitch connection point with a trailer, and to visibly indicate when that point has been reached.

BACKGROUND OF THE INVENTION AND DESCRIPTION OF RELATED ART

Recreational trailers for boats, campers, snowmobiles and the like are typically provided with ball-and-socket hitches. The owners of such trailers know the difficulty in backing a hitch-equipped towing vehicle up to a trailer socket in order to get close enough for a convenient manual hitch connection. The mating trailer-side and vehicle-side halves of the hitch are below the rear window of the vehicle, and are not visible to the driver as he backs up. As a result the hitch halves are often left too far apart, leaving the driver with a lot of work once he puts the vehicle in park and gets out to make the hitch connection, or forcing him to get back in the vehicle and try again. Less cautious drivers may damage the vehicle or trailer.

Devices for improving the driver's accuracy in positioning the vehicle-half of the hitch near the trailer-half of the hitch are commonly known as "hitch guides". U.S. Pat. No. 4,621,432 to Law shows a trailer hook-up guide system in which a sighting fork is mounted on the rear of the vehicle and a flexible sighting pole is securely attached to the jack stand or tongue portion of the trailer with a relatively complicated bracket and/or clamp mechanism. The sighting pole has a lower "tail" centered by a U-shaped bracket below the socket of the trailer hitch; when the tail is struck by the ball hitch on the vehicle, it causes an upper end of the sighting pole to vibrate, signaling the driver that the ball is directly under the trailer hitch socket. The mechanism is relatively complicated to install and detach, and it appears that the fixed sighting pole is subject to breakage, and could interfere with making the hitch connection since the tail is centered under the trailer socket. The goal is apparently to achieve an exact vertical alignment of the trailer socket and hitch ball using the sighting fork and socket-centered sighting pole.

U.S. Pat. No. 6,279,940 to Beavington shows a hitch guide with a vertical rod releasably secured with clamps to the vertical "crank" or jack stand on the trailer, and a horizontal rod slidingly mounted on the upper end of the vertical rod to touch a sticker applied to the rear window of the vehicle when the trailer socket is aligned over the hitch ball. Again, the goal is apparently to achieve an exact vertical alignment between the trailer socket and hitch ball, by mating the small but precise aiming points of the sticker and the tip of the horizontal rod.

A company named Q-Works Corporation sells a two-rod system called "Hitchin'Rods", in which a first rod with a flat magnetic base is mounted on the flat top surface of the trailer tongue behind the hitch socket, and an identical rod with a flat magnetic base is mounted on a flat surface on top of the ball hitch on the vehicle. The rod on the trailer serves as an alignment marker, while the rod on the ball hitch serves as a vehicle-side alignment aid and additionally is knocked off the ball hitch by the trailer socket when the ball hitch is underneath the socket. One potential problem with this system is visual confusion between the rods. Another potential problem is a hitch ball without a flat top or a top that is iced up, preventing a good connection with the ball-mounted rod. Another drawback is the extra cost of a two-rod system. And, like the other prior hitch guides described above, the operation of the ball-centered second rod appears to rely on achieving an exact vertical alignment with the trailer socket, which the present inventor believes is unrealistically optimistic and may increase the likelihood of damaging the vehicle or trailer.

BRIEF SUMMARY OF THE INVENTION

The present invention is a simple, one-part, trailer-side hitch guide in which an upright rod has a magnetic base contoured to mate with a forward end or face of the trailer-side hitch socket, and a lever arm extending below the magnetic base in a position below and forward of the trailer socket to be tripped by the vehicle-mounted ball hitch as it nears the trailer socket.

The socket-forward position of the lever arm accommodates the time lag between the tripping of the guide/indicator rod and the driver's stopping the vehicle. The socket-forward mounting also accommodates the frequent difference between the estimated and actual relative heights of the trailer socket and hitch ball, resulting in a reduced likelihood of overshooting the trailer socket and of damaging the vehicle or trailer.

The socket-forward position of the magnetic base and the lever arm also ensure a positive, reliable break in the magnetic connection between the hitch guide and the trailer socket, and thus a more positive visual indication that the ball hitch is close enough to the trailer socket for a convenient hitch connection.

These and other features and advantages of the invention will become apparent on reading the following detailed description in light of the accompanying drawings.

DETAILED DESCRIPTION OF THE INVENTION

Figure 1:
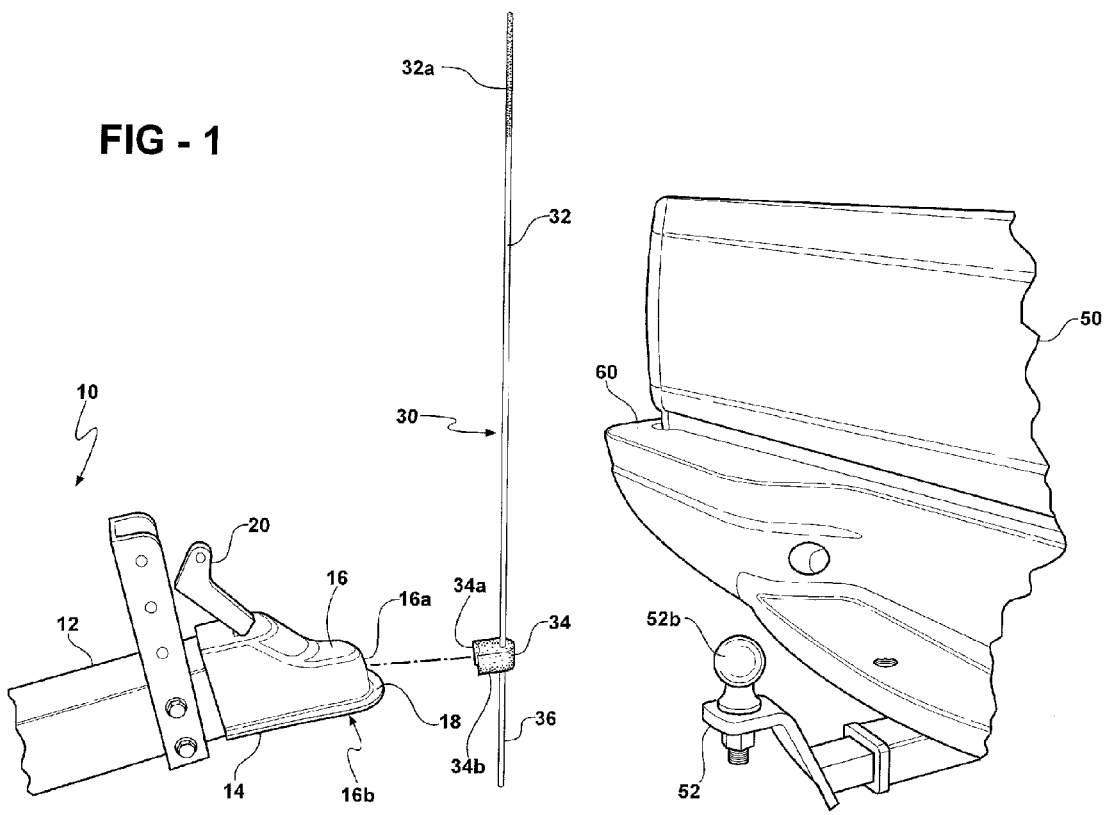
FIG. 1 is a perspective view of a hitch guide according to the invention relative to a trailer socket and a mating vehicle-mounted ball hitch, with the hitch guide shown separated from the trailer socket for clarity.

Referring first to FIG. 1, a recreational trailer 10 of known type is shown from its tongue or drawbar portion 12 forward. Trailer 10 can be any known type of recreational or similar trailer with a ball-and-socket type hitch mechanism, where the operator of a hitch-equipped vehicle 50 makes a hitch connection by backing the vehicle up to a point where the vehicle-side portion 52 of the hitch is sufficiently close to the trailer-side portion 14 of the hitch that the vehicle can be stopped and the driver can get out and make the final connection by hand without too much trouble. Although a particular ball-and-socket type hitch mechanism 14, 52 is illustrated by way of example, the invention could be used with other ball-and-socket type hitches that operate in similar fashion.

Hitch portion 14 on trailer 10 is the forward-most portion of the trailer. The female hitch portion 14 normally has a socket defined by a rounded surface or hood 16 made of steel, matching the contour of the male hitch ball 52 on vehicle 50, and having a generally vertical front face 16*a*, and a downward-facing socket opening 16*b* for receiving the ball 52*b* in known manner. Trailer-side hitch portion 14 may also have a horizontal lip or flange such as 18, and often has ball-locking structure 20 as well. It will be understood that although one particular style of female hitch portion 14 is illustrated, the surface contours of the socket 16 on different hitches may vary even though they accept the same ball hitch.

The trailer-side socket portion 14 of the hitch is invariably made from ferromagnetic steel. A hitch guide 30 according to the invention is adapted to be magnetically attached to the front end or face of socket portion 14, forward of the actual socket 16. Hitch guide 30 is an elongated rod with an upper guide portion 32 above a magnetic base 34, and a lower lever arm 36 below magnetic base 34. Magnetic base 34 is sized and shaped to attach to the front end of trailer-side socket portion 14, in the illustrated embodiment to the forward face 16*a* of socket 16. In the illustrated embodiment base 34 has a rear magnetic face 34*a* shaped to approximate the contour of socket face 16*a* for a strong magnetic connection. The degree of approximation can vary and the important thing is that base 34 attach securely to the face by magnetic force, preferably with at least two spaced contact points if not a perfect face-to-face match. As illustrated, magnetic base 34 also preferably has a lower rear flat surface portion 34*b* sized to rest on any lip or flange such as 18, and the lower surface 34*b* may be made magnetic as well for both magnetic and mechanical support on lip 18. If for some reason the front of trailer-side hitch portion 14 is not made of ferromagnetic steel, a steel piece or a magnet can be more permanently attached to it with adhesive or screws to allow a magnetic connection with base 34.

It will be understood that the rod portions 32, 36 of the hitch guide are not limited to true cylindrical rods, nor do upper portion 32 and lever arm 36 need to be the same shape or diameter or material, and "rod" should be understood to generally include elongated, sufficiently rigid members that serve the same function.

The type of magnet used in base 34 and the mechanical construction of the base can vary as will be understood by those skilled in the art. For example, base 34 could be a uniform single piece of magnetic material, or could have a magnetic portion layered between or enclosed by other materials.

As noted above, for a socket 16 with a lip or flange such as 18, hitch guide 30 is preferably designed to additionally rest on or be magnetically connected to lip 18. If the flange 18 extends far enough forward of socket face 16*a*, it may even be possible to magnetically attach the hitch guide solely to the flange 18 in front of the socket.

Guide portion 32 of the hitch guide extends upward from magnetic base 34, high enough that at least its upper end 32*a* can be seen through a rear window or rearview mirror of vehicle 50 when base 34 is attached to the front of socket 16. Upper end 32*a* is preferably colored for visibility to the driver, and may additionally be provided with a ball or flag or similar movement-accentuating appendage. Lever arm portion 36 extends below magnetic base 34 to a point below trailer socket opening 16*b*, such that a ball hitch moving rearwardly toward a connection point aligned below opening 16*b* will hit the lever arm 36. The socket-forward attachment of magnetic base 34 to the generally vertical face 16*a* ensures that even light contact with lever arm 36 will break the magnetic connection (FIG. 3), causing upper guide portion 32 to fall over and visibly indicate to the driver that a suitably close trailer-hitching position has been reached. Where the socket has a flange such as 18, the fact that only a rear portion of the magnetic base rests on the flange, while the remainder of base 34 and the weight of guide portion 32 and lever arm 36 are forward of the flange, ensures the same positive movement of hitch guide 30 when lever arm 36 is contacted by the hitch ball.

Although in the illustrated embodiment of FIG. 1 the position of magnetic base 34 on hitch guide 30 is fixed for simplicity, the magnetic base can be mounted for vertical adjustment on guide 30, allowing the relative lengths of guide rod portion 32 and lever arm portion 36 above and below the trailer socket to be adjusted.

In the illustrated embodiment, the rod portions 32, 36 of hitch guide 30 are made from a single piece of material such as fiberglass or plastic extending through base 34. A commercially available magnet is molded or inserted or built into or formed as base 34 to create a sufficient magnetic attachment force at rear socket-engaging face 34*a*. It will be understood by those skilled in the art that the construction of hitch guide 30 may be unitary, with upper rod 32, base 34, and lever arm 36 molded or otherwise formed in one piece, or it may be of multi-part construction with one or more of the upper rod 32, base 34, and lever arm 36 formed separately and attached to the other parts by known techniques such as adhesive bonding, welding, or mechanical fastening. It will also be understood that materials other than the preferred materials listed can be used for different portions of guide 30, including but not limited to wood and metal. It will also be understood that although it is preferred that upper guide rod 32 and lever arm 36 are coaxially aligned, they need not be aligned with one another as long as lever arm 36 remains in front of the socket.

Figure 2:
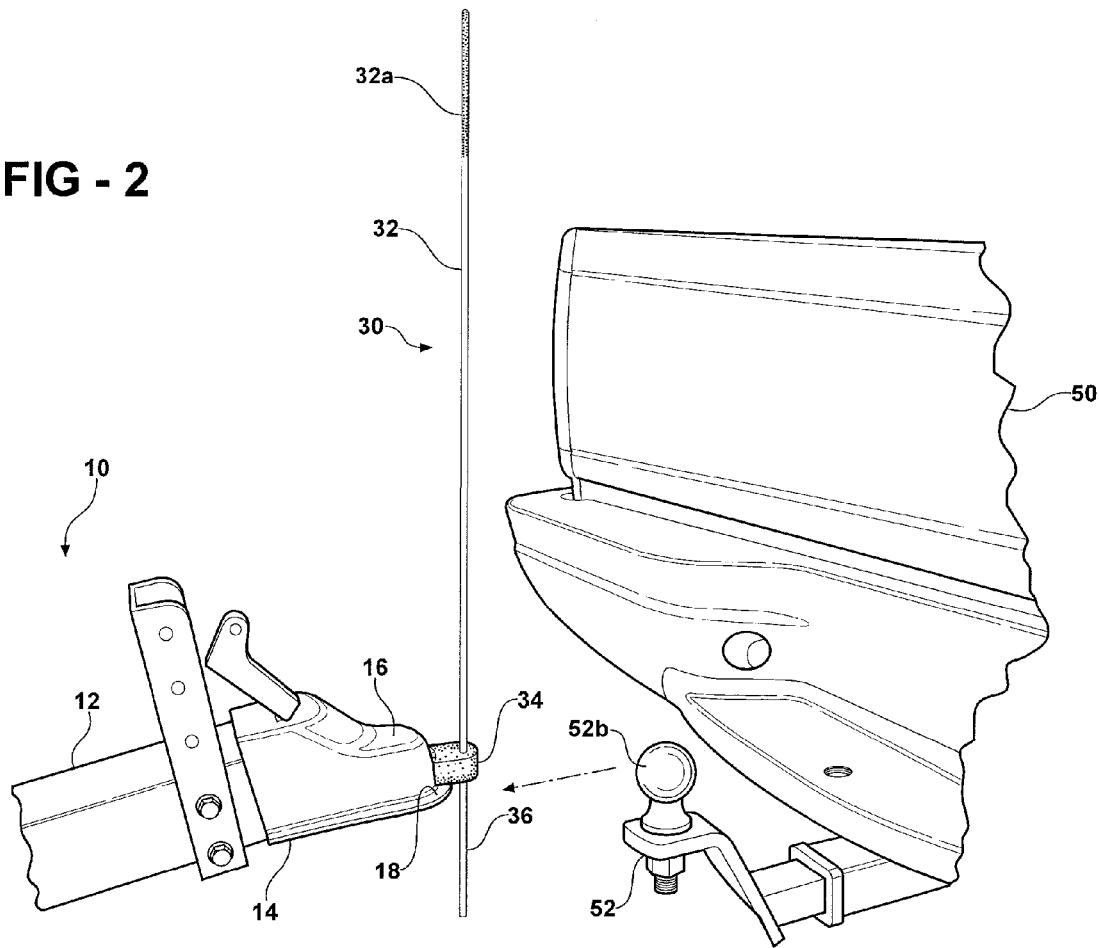
FIG. 2 is a perspective view of the trailer socket and hitch guide of FIG. 1, with the hitch guide mounted on the trailer socket, and with the vehicle-mounted ball hitch approaching the trailer socket.
Figure 3:
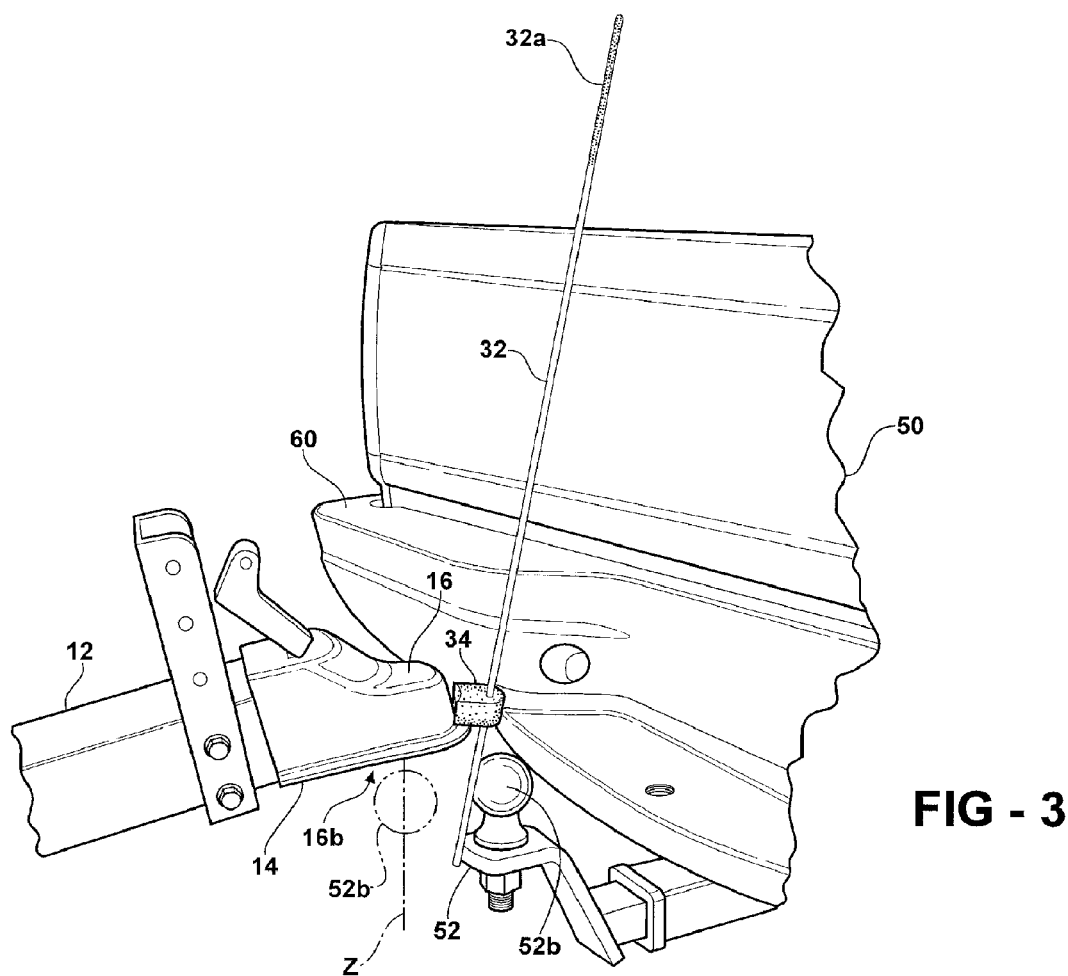
FIG. 3 illustrates the ball hitch of FIG. 2 tripping the hitch guide off the trailer socket.

FIGS. 2 and 3 show vehicle 50 backing up, and ball hitch 52 approaching (FIG. 2) and then tripping (FIG. 3) hitch guide 30 to provide a visual indication through the vehicle's rear window or rear-view or side-view mirrors that ball hitch 52 has come acceptably close to alignment with trailer socket 16. The socket-forward location of lever arm 36 ensures that the tripping action begins to occur before ball 52*b* is in vertical alignment with socket 16 (vertical alignment is shown schematically as a vertical axis Z from the center of the trailer socket through a phantom ball). The socket-forward activation of guide 30 allows for some continued rearward motion of the ball 52*b* toward the socket opening 16*b* during the time it takes an alert driver to react by braking. Once the vehicle is stopped, the experienced driver will immediately apply the parking brake before shifting from reverse into park, thus eliminating the follow-up vehicle motion that typically occurs when the vehicle transmission is shifted. The driver then gets out of the vehicle to make the hitch connection by hand.

Figure 4A:
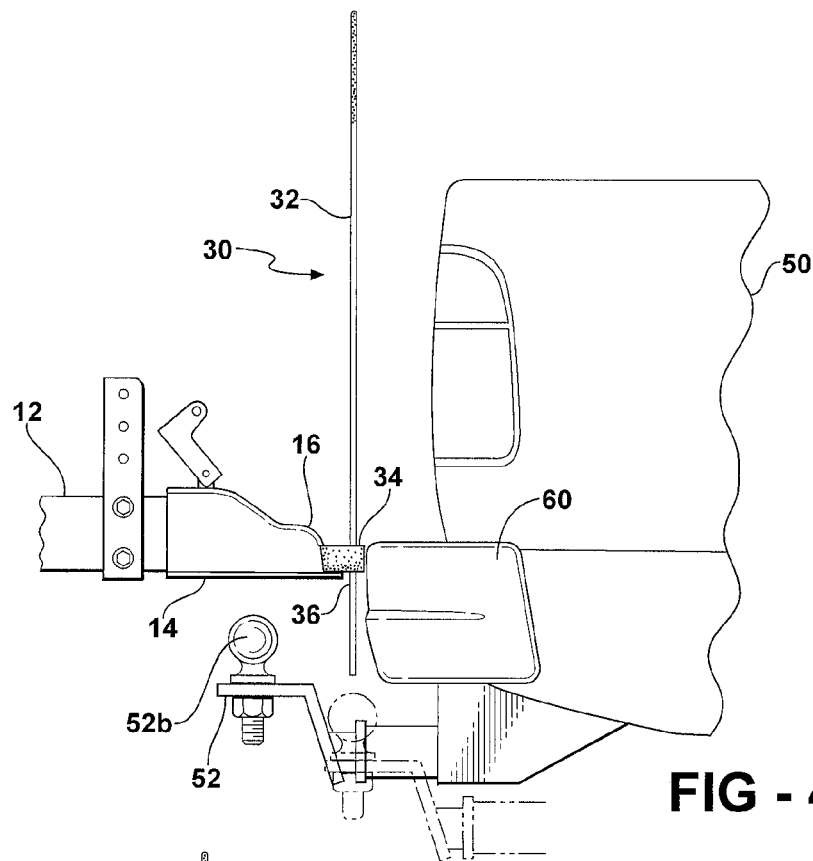
FIGS. 4A and 4B are side elevation views of the hitch and hitch guide of FIGS. 1-3, illustrating high and low errors in alignment of the ball hitch and trailer socket, respectively.
Figure 4B:
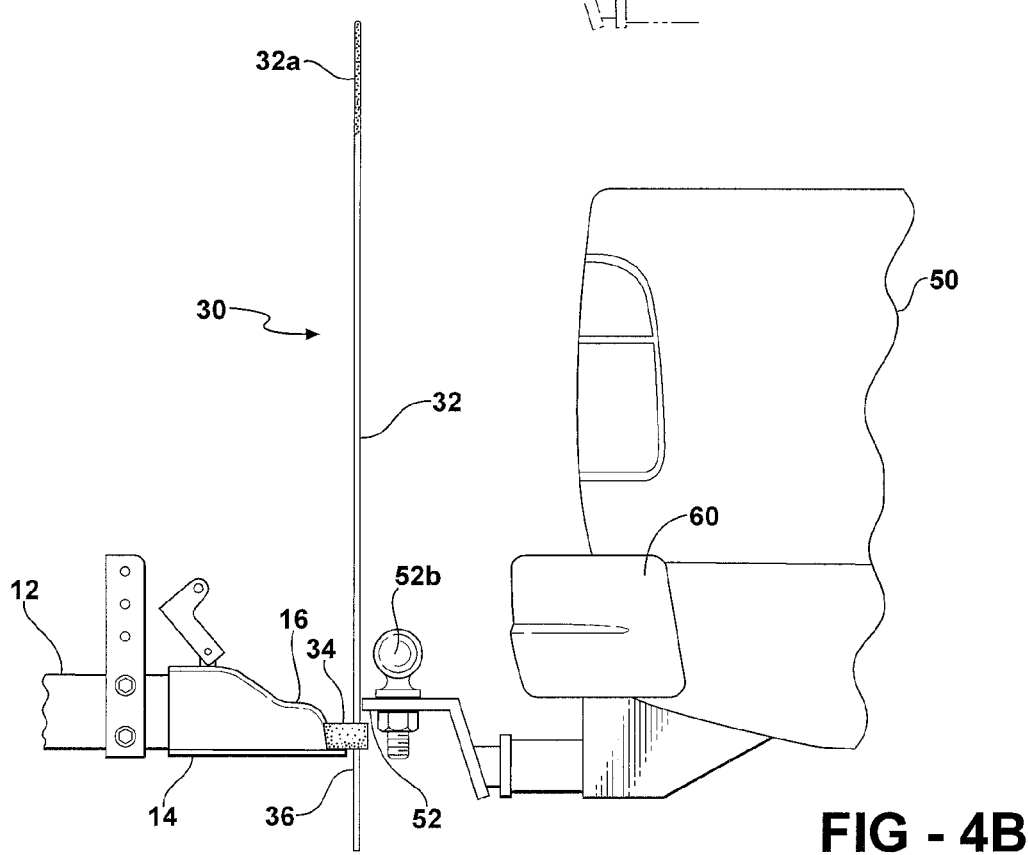

FIGS. 4A and 4B show another advantage of the socket-forward mounting location of hitch guide 30, namely an increased likelihood that the driver of the vehicle will be warned against damaging contact if he overshoots the trailer socket. Estimating the height difference between the trailer socket 16 and hitch ball 52*b* is usually an eyeball estimate, and although the height of the trailer socket 16 can often be adjusted with a screw jack stand built into the trailer tongue 12, mistakes big enough to miss lever arm 36 can be made by an inexperienced driver. If as shown in FIG. 4A the hitch ball comes in too low (phantom lines) or too far to either side (solid lines) to hit lever arm 36, a rear portion of the vehicle bumper 60 is likely to contact some portion of hitch guide 30 before the vehicle hits trailer socket 16. The driver will see hitch guide 30 fall over as usual, and will immediately stop the vehicle. If done promptly, damage to the vehicle or the trailer may be minimized or avoided. Likewise, if the hitch ball 52b comes in too high as shown in FIG. 4B, the ball (or part of the bumper) will likely strike upper guide rod 32 before making contact with any part of the trailer, resulting in the same instinctive damage-preventing action by the driver. Of course, practice and an experienced eye are preferred, and are the best protection against such mistakes.

Figure 5:
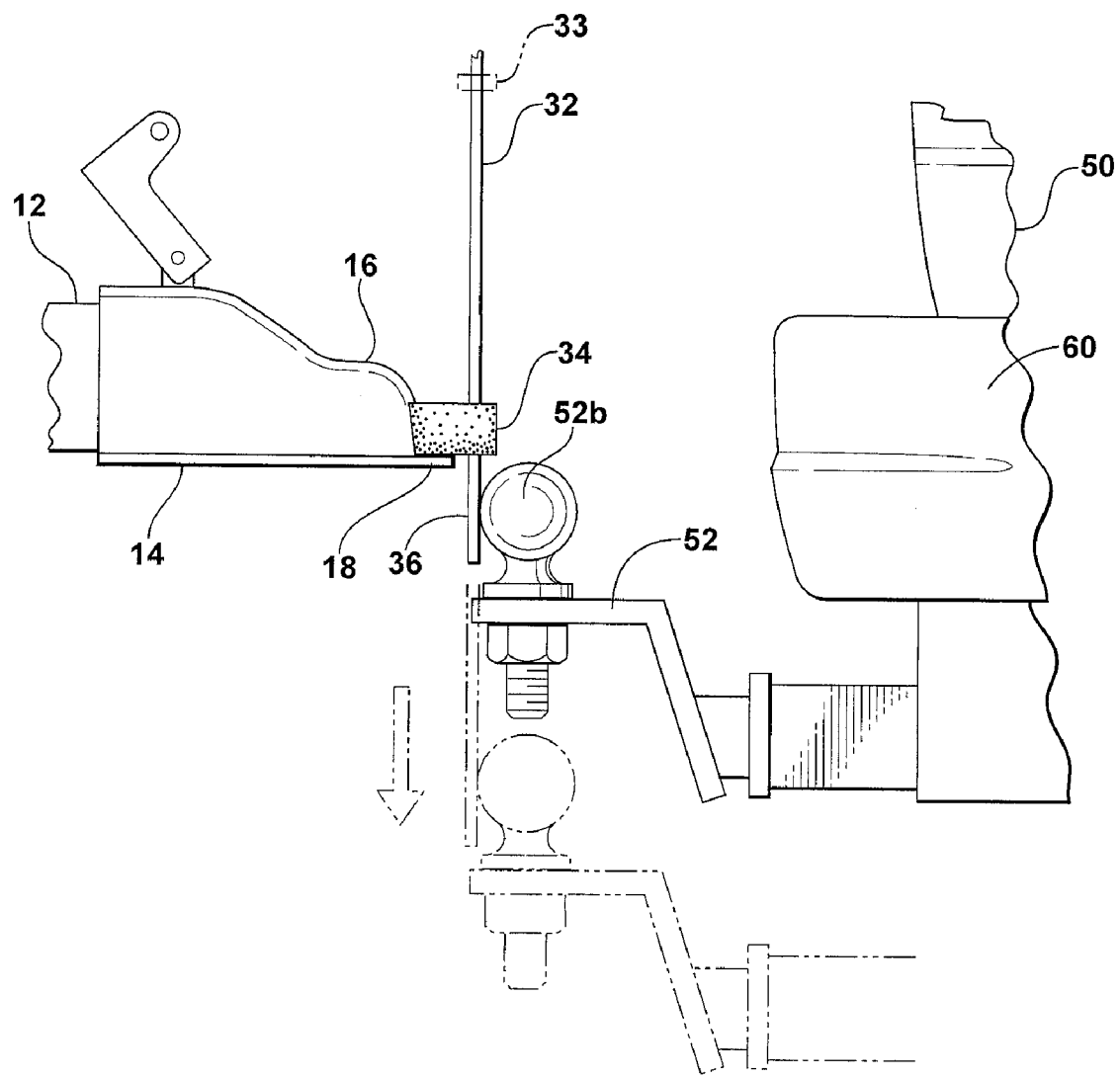
FIG. 5 is a side elevation view similar to FIG. 3, but showing optional height adjustment and height estimation features.

FIG. 5 illustrates some optional features that may be added to or incorporated into hitch guide 30. First, the attachment of magnetic base 34 to the rod may be a vertically adjustable attachment, for example through a frictional sliding fit between base 34 and the rod, or through a loose sliding fit with a releasable mechanical fastener such as a thumb or socket screw, or via a magnetic attachment between the magnet in base 34 and a magnet or ferromagnetic metal on the rod. Second, a sliding height estimator 33, in the illustrated example a neoprene type washer, may be mounted on upper guide portion 32. The height estimator can be used to roughly measure the height of hitch ball 52b from the ground and compare it to the height of trailer socket 16, allowing the driver to make adjustments to the socket height or to the position of an adjustable magnetic base 34 on the hitch guide.

It will finally be understood that the disclosed embodiments are representative of presently preferred forms of the invention, but are intended to be illustrative rather than definitive of the invention. The scope of the invention is defined by the following claims.

What is claimed is:

1. A trailer-side hitch guide for a ball-and-socket hitch, the hitch guide comprising a single guide rod comprising an upper rod portion with a magnetic base for magnetic attachment to a generally vertical front face of a socket-forward portion of a trailer-side hitch socket, the upper rod portion extending upwardly from the hitch socket to a point visible to a driver of a towing vehicle equipped with a hitch ball when the magnetic base is attached to the hitch socket, the guide rod further comprising a lever arm portion extending below the magnetic base forwardly of and below a socket opening on the hitch socket when the magnetic base is attached to the hitch socket, such that a hitch ball being driven into alignment with the hitch socket breaks the magnetic attachment of the guide rod to the hitch socket through the lever arm portion, causing the guide rod to begin to fall over before the hitch ball is vertically aligned with the trailer socket.

2. The hitch guide of claim 1, wherein the magnetic base comprises a rear magnetic face contoured to approximate a surface contour of the generally vertical front face of the socket-forward portion of the hitch socket.

3. The hitch guide of claim 1, wherein the socket-forward portion of the hitch socket further comprises a generally horizontal flange, and the magnetic base comprises a rear bottom surface behind the lever arm adapted to rest on the generally horizontal flange.

4. The hitch guide of claim 1, wherein the socket-forward portion of the hitch socket comprises a generally horizontal portion, and the magnetic base is adapted to magnetically attach to the generally horizontal portion behind the lever arm portion.

5. The hitch guide of claim 1, wherein the magnetic base is vertically adjustable on the hitch guide to vary the relative lengths of the upper rod portion and the lever arm portion.

6. The hitch guide of claim 1, wherein the upper rod portion and the lever arm portion comprise a continuous rod extending through the magnetic base.

7. The hitch guide of claim 1, wherein the upper rod portion and the lever arm portion are vertically aligned.

* * * * *